SELECTIVE DELAY DEVICE

Filed Nov. 25, 1964 2 Sheets-Sheet 1

INVENTOR.
JOHN B. PAYNE
BY Harry A. Herbert Jr
and George Line
ATTORNEYS

INVENTOR.
JOHN B. PAYNE

BY Harry A. Herbert Jr
and George Fine
ATTORNEYS

United States Patent Office 3,319,088

Patented May 9, 1967

3,319,088

SELECTIVE DELAY DEVICE

John B. Payne, Rome, N.Y., assignor to the United States of America as represented by the Secretary of the Air Force Filed Nov. 25, 1964, Ser. No. 414,032
2 Claims. (Cl. 307—88.5)

The invention described herein may be manufactured and used by or for the United States Government for governmental purposes without payment to me of any royalty thereon.

This invention relates to a digitally controlled delay device utilized in an array antenna system to steer the main beam by varying the relative phase shift of the signals passing through the delay device wherein the basic element of the delay device is a stable wideband amplifier which can be gated to control the signal path through or around an incremental delay unit.

In array antennas it is desirable to steer the position of the main beam by varying the time delay between elements. However, in narrow band systems it can be shown that steering by varying the relative phase shift between elements produces the same result with negligible loss in signal to noise.

Digitally controlled delay lines or phase shifters have been used for the past several years in steering phased array antennas. Lincoln Laboratory of Lexington, Mass., has conducted an extensive program in the development of such devices. Much of Lincoln's work can be found in their Technical Report #228, 236, and 299. Most digital delay line or phase shift devices use diodes to switch the signal through or around a length of transmission line cut to give the desired incremental delay or phase shift.

These diodes, however, have a finite series resistance when forward biased and therefore produce loss. Additional loss is usually introduced so as to reduce the fluctuation in amplitude as the signal path is changed.

The matching of these diodes and the proper termination of the incremental delay units is accomplished at the expense of bandwidth. Series diode resistance plus diode reactance also results in poor matching and SWR between the incremental delay units.

In narrow band phase steered systems a maximum shift of 360° is all that is required. Larger amounts of phase shifts are redundant and can be eliminated.

A typical 6 bit, 28 mc.p.s. digital phase shifter or delay line is described in the aforementioned Lincoln Laboratory Technical Report 228. It was designed to produce a total of 360° phase shift at 28 mcs. by switching either through or around 6 lengths of coax by the use of diode switches. Total insertion loss was 11 db. The setup time ran about 3 sec. with a maximum amplitude error of .25 db and phase error of 2°. Input power capacity was limited to 1 watt. Each diode switch required about 40 ma. in order to reduce the diode series resistance to a useable value.

As the bandwidth of a phase steered array system is increased, a point is quickly reached where the loss in signal to noise no longer can be neglected. This deterioration in system performance can be alleviated by returning to true time delay steering; that is time delays greater than that equivalent to 360° of phase shift. Digitally controlled phase shifter or delay devices developed in the past for phase steering are no longer applicable. Their major limitations are their relative narrow bandwidth of operation and large insertion loss.

The delay system of the present invention utilizes wideband amplifiers. It is the bandwidth of these amplifiers that determine the system bandwidth (200 to 800 mc.). These amplifiers are gated. By using wideband amplifiers in place of the diode switches three advantages are gained: (1) Each delay line (coax) is properly terminated into its characteristic impedance over the frequency band of interest; this prevents loss due to excessive SWR; (2) Each delay line increment is isolated from the next due to the presence of amplifiers; (3) With the inclusion of amplifiers the total input-output gain can be made equal to or greater than unity (gains as high as 100 db for a 10 bit device are achievable with bandwidths of 200 mc.).

This wideband digital delay line is inherently a low frequency device. By low frequency we mean IF frequencies in the range up to 600 or 700 mc. If we wish to process a signal with a 200 or 300 mc. bandwidth the IF center frequency would more than likely be located in the range of 200 to 300 mc.

The present invention provides a high gain, wideband, digitally controlled time delay device by utilizing gated wideband amplifiers in combination with incremental delay units and controlled signal paths. This device is designed to operate in the 300 to 500 mc. range which would be the IF frequency for a wideband system. The wideband amplifiers provide a net gain and are gated to control the signal path through or around the incremental delay unit. Bandwidths on the order of 200 mc. or better are obtainable with a gain of 100 db for a 10 bit system. Such a device operating at IF frequency would also eliminate the IF amplifier. It is to be noted that the present invention solves the insertion loss and the bandwidth problems in digital delay line techniques for application to array antenna steering.

It is an object of my invention to provide a wideband digitally controlled delay device.

Another object of my invention is to provide a high gain, wideband digitally controlled time delay device including wideband amplifiers to achieve a net gain and which are gated to control the signal path through or around an incremental delay unit.

Yet another object of my invention is to provide a digitally controlled delay device utilized in an array antenna system to steer the position of the main beam by varying the relative phase shift of the signals passing through the delay device.

The novel features that I consider characteristic of my invention is set forth with particularity in the appended claims. The invention itself, however both as to organization and its method of operation, together with additional objects and advantages thereof, will be understood from the following description of a specific embodiment thereof when read in conjunction with the accompanying drawings, in which:

Figure 3A:
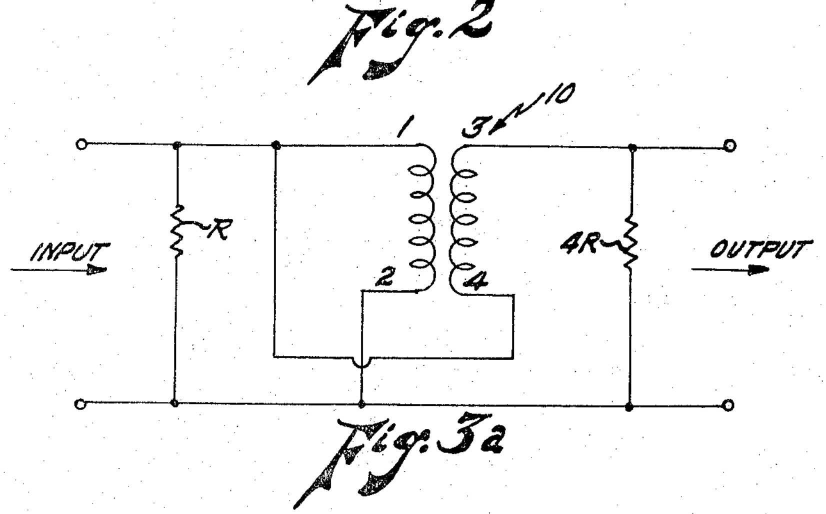
Figure 3B:
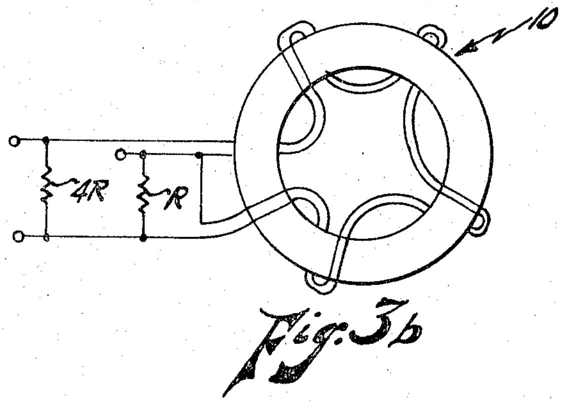
Figures 4, 5:
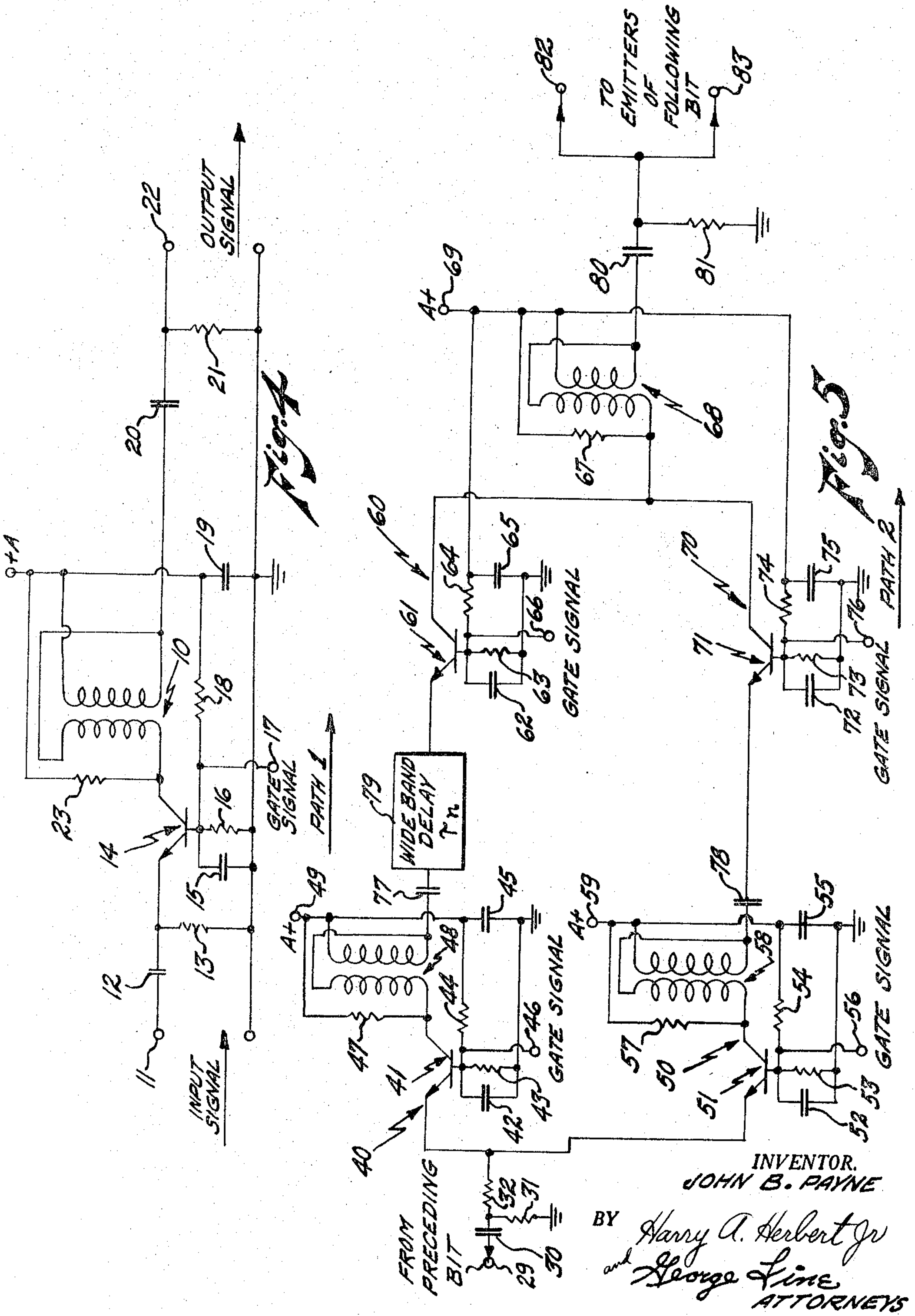

FIGURE 3*a* illustrates schematically an impedance transformer to be utilized with a wideband amplifier;

FIGURE 3*b* is the actual wiring diagram for the impedance transformer shown in FIGURE 3*a*;

FIGURE 4 is a schematic diagram of a wideband amplifier including the transformer illustrated in FIGURE 3; and FIGURE 5 is a schematic diagram of a single bit of a wideband digital delay line which is a preferred embodiment of this invention.

Figure 1:
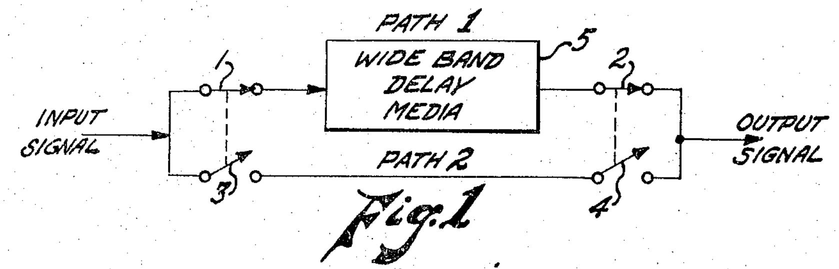
FIGURE 1 illustrates a single bit digital delay line.

Now referring to FIGURE 1, which illustrates in simplified form a technique for switching a signal through or around a length of transmission line cut to give the desired incremental delay or phase shift. This transmission line is wideband delay media 5. The input signal can be delayed through path 1 simply by closing switches 1, 2 and opening switches 3, 4. Path 2 is selected by closing switches 3, 4 and opening switches 1, 2. However his switching is mechanical and for utilization such as teering a radar beam, the switching is not sufficiently ·apid. It is to be noted that switches 1, 2, 3. 4 may be ·eplaced with diodes and then by controlling the magni- ude and direction of current flow through the diodes the nput signal may be directed through either path 1 or path ?. The present invention however provides a stable wide- )and amplifier that can be gated. A multiplicity of such implifiers are utilized in combination to switch the signal hrough or around a length of transmission line cut to give he desired incremental delay or phase shift.

Figure 2:
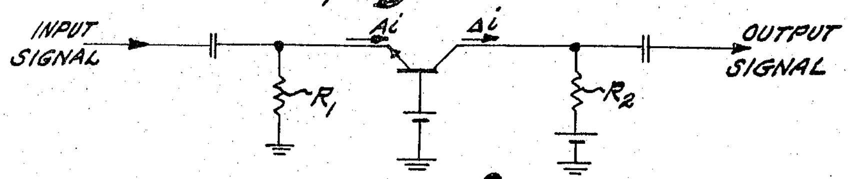
FIGURE 2 is a schematic diagram of a ground base amplifier.

Now referring to FIGURE 2, there is shown the basic videband amplifier configuration. The input signal )ower is:

$$P_{in}=R_1(\Delta i)^2 \quad (1)$$

vhere $R_1$ is the amplifier's input impedance. In the grounded base configuration the emitter signal current is ipproximately equal to the collector signal current. Therefore, the amplifier's output signal power is:

$$P_{out}=R_2(\Delta i)^2 \quad (2)$$

The amplifier's power gain then becomes $$G_p=R_2/R_1 \quad (3)$$

The amplifier gain is thus fixed by the ratio of the input to )utput impedance. This relationship is valid as long as he cutoff frequency of the transistor is not exceeded. The figure of merit for amplifiers is normally given as the gain X bandwidth product, $f_t$, in mcs. Thus, the upper bandwidth limitation, $f_c$, on the grounded base amplifier can be written as $$f_c=f_t/G_p \quad (4)$$

The amplifier can easily be gated off by either grounding the base directly or by applying a small negative bias to the base. When reverse biased the opened switch produces at least 20 db isolation in the band of interest.

It is desirable to have the amplifier's input and output impedance equal. When resistive coupling is used as shown in FIGURE 2 unity gain is obtained from Equation 3. Since longer lengths of coax cable used for delay lines produce attenuation, it is desirable that the amplifier produce gain. Gain can be obtained by using broad band transformers. The particular transformer useful in this case is 4:1 impedance transformer 10 shown in FIGURES 3*a* and 3*b* which is wound to form a transmission line from which there is obtained over 700 mc. bandwidths at the 3 db points with the lower cutoff at 200 kc. and the upper cutoff at 715 mc.

FIGURE 3*a* illustrates the schematic diagram of aforementioned 4:1 impedance transformer 10 having at the input an impedance R and at the output an impedance 4R. FIGURE 3*b* shows the actual wiring diagram of 4:1 impedance transformer 10. When this transformer is combined with the grounded base amplifier of FIGURE 2 a power gain of 4 is possible, that is 6 db. FIGURE 4 is a schematic of this combination.

Now referring to FIGURE 4, the input signal is received at terminal 11 and applied to the emitter of transistor 14 by way of capacitor 12 and resistor 13. Transistor 14 in this embodiment was a 2N709. The base of transistor 14 is connected to ground by way of the parallel arrangement of capacitor 15 and resistor 16. The base of transistor 14 is also connected to ground by way of resistor 18 and capacitor 19 and to the A+ voltage source by way of resistor 18. The collector of transistor 14 is connected to an A+ voltage source by way of resistor 23 and also to output terminal 22 by way of 4:1 impedance transformer 10 and capacitor 20. Resistor 21 represents the output impedance. Transistor 14 is gated off by application of a gating signal from terminal 17 which is applied to the base thereof. Resistors 13 and 21 should be thought of in terms of $R_0$ and resistor 13 equals $4R_0$.

In the operation of the wideband amplifier of FIGURE 4, transistor 14 has an $f_t$ of 800 mc. that gives a bandwidth of 200 mc. when used with 4:1 impedance transformer 10. This has been verified experimentally where the input impedance was 52 ohms. When the input signal was taken directly from a sweep generator output, the response to 200 mc. was within 1 db of being flat. When a 10 ft. length of 52 ohm coax was connected between the sweep generator and the amplifier input, the amplifier output showed ripples of about 1 db amplitude due to a nonideal termination, the 3 db dropoff was above 200 mc.

Since loss will vary from bit to bit due to the different lengths of delay cable, the amplification must be controlled without disturbing the cable match. This could be accomplished by introducing a small adjustable resistance in series with the emitter. If each stage gain were reduced to 5 db, a 10 bit delay line would produce 100 db of gain over the band required. If less bandwidth is desired, a filter could be placed at the input and output. The bandwidth of each bit could be extended at the expense of gain. As new transistors become available the bandwidth will be extended for a fixed gain.

It should be noted tha this digital delay and amplifier device does not require intricate tuning. The transformer is easily wound and the transistor is not expensive. If a bandwidth of 150 mc. is desired a 2N708 could be used at a cost of about $2.00 each which is quite reasonable for the job it performs.

Four such wideband amplifiers as illustrated in FIGURE 4 are connected as shown in FIGURE 5 and are designated by the characters 40, 50, 60 and 70. Common emitter resistor 31 is used for both amplifiers 40 and 50 since they are not on at the same time and single emitter resistance 31 provides better matching of the preceding stage as well as fewer components and shorter stray lead length and capacitance which could reduce bandwidth and increase S.W.R. Also it is noted that transistors 61 and 71 of amplifiers 60 and 70, respectively, have their collectors connected to each other and only 4:1 impedance transformer 68 is utilized for both. Since only one of these amplifiers 41 or 43 is on at a time, this also provides better matching to the following delay bit stage. As before this reduces components and stray lead inductors and capacitance.

Now referring in greater detail to FIGURE 5 which is a preferred embodiment of the present invention and is a schematic diagram of a single bit of the wideband digital delay device, wideband delay 79 may be a transmission line cut to give the desired incremental delay or phase shift for use in steering the beam of a radar antenna. Wideband amplifiers 40, 60, 50 and 70 are utilized to switch the input signal from terminal 29 through or around wideband delay 79. Amplifiers 40, 50, 60 and 70 may be normally operative and amplifying. In order to gate them off, signals are applied to terminals 46, 56, 66 and 76, respectively. When it is desired that the input signal from terminal 29 pass through delay 79, gating signals are applied simultaneously to terminals 56 and 76 thus gating off amplifiers 50 and 70. The input signal then is amplified by amplifier 40, passed through delay 79 and amplified by amplifier 60 and then fed to terminals 82 and 83 by way of capacitor 80 and resistor 81. When the sequency of operation no longer requires the aforementioned delay, the gating off signals are removed from terminals 56 and 76 and are simultaneously applied to terminals 46 and 66. Amplifier 40 and 60 are thereby switched off and amplifiers 50 and 70 become operative and amplify the input signal from terminal 29. The input signal, in its amplified version, is fed to terminals 82 and 83 by way of capacitor 80 and resistor 81. It is to be noted that signal path 1 is comprised of amplifier 40, delay 79 and amplifier 60 and path 2 of amplifiers 50 and 70. The gain of each path can be adjusted by changing resistor 47 or 57, respectively. The delay bit stage gain can be controlled by introducing resistor 32 in series with the input or by changing the value of resistor 67.

Previously the wideband delay line for insertion between amplifiers 40 and 60 has not been considered. Any delay device considered should not be too lossey; however, this is of secondary importance with the addition of amplifiers. Of primary importance is the dispersion of these devices. They should be operated well in the non dispersive region. The most obvious method for realizing a wideband delay line would be the use of a fixed length of coax cable. Different lengths of cable would produce different delay times.

Over a wide frequency range the attenuation of coaxial cable is a function of frequency. For instance RG–8/U which has a characteristic impedance of 52 ohms and 29.5 pfd./ft. has an attenuation per 100 ft. of .16 db at 1 mc.; .55 db at 10 mc.; 2 db at 100 mc.; and, 8.6 db at 1 GC. A second consideration would include the size of the cable since a 50 ft. coil could take up quite a bit of room. There are some manufacturers that produce small low capacitance cable.

A coaxial cable with a high dielectric constant is desirable since this will reduce the propagation velocity and thus result in shorter lengths of cable. RG–8/U has a relative velocity of propagation of 65.9%.

By mismatching the wideband transformers, they can be made to give a slight increase in gain with frequency. This effect could be used to compensate to a limited degree the attenuation characteristics of the cable.

Generally helical high-impedance delay cables are dispersive above a critical frequency. This upper critical frequency is seldom above 10 mc. which would eliminate it from consideration. However, variations of this technique could no doubt be devised to extend this frequency to several hundred megacycles.

The lumped-parameter delay line technique appears to offer some possible solutions. Philco under RADC sponsorship has been developing an electronically variable time delay technique using all-pass networks similar to the symmetrical lattice phase correction network. A typical network could produce delays from 15 to 8 nanoseconds; or a variation of 7 nanoseconds with a bandwidth of 20 to 30 mc. The variation in delay is produced by matched varactors. To extend the bandwidth to several hundred megacycles requires high quality diodes that become quite expensive. As the frequency is increased the delay through the device could be used to obtain the desired incremental delay. With adjustable capacitors each increment of delay could easily be adjusted to the proper value.

Several disadvantages, however, would be the need for additional amplification due to the fixed insertion loss of each unit. A number of these networks would also be needed in series to produce total incremental delays.

The coaxial cable technique could be combined with the adjustable lumped constant network for easy final adjustment.

Thus there is provided by the use of four wideband gated amplifiers in combination with a preselected delay a high gain, wideband digitally controlled time delay device which provide a net gain and are gated on or off to control the signal path through or around an incremental delay unit. Bandwidths of 200 mc. or better are obtainable with a gain of 100 db for a 10 bit system. Such a device operating at IF frequencies would also eliminate the IF amplifier stage.

Although I have shown and described a specific embodiment of my invention, I am fully aware that many modifications thereof are possible. My invention therefore is not to be restricted except insofar as is necessitated by the prior art and by the spirit of the appended claims.

What is claimed is:

1. A wideband delay device for utilization in a system for steering electronically the beam of a radar antenna array comprising two signal paths, the first of said signal paths consisting of a series arrangement of a first wideband input transistor amplifier, a first capacitor, preselected delay means, and a first wideband output transistor amplifier, the second of said signal paths consisting of a series arrangement of a second wideband input transistor amplifier, a second capacitor, and a second wideband output transistor amplifier, said amplifiers operating in the multi-hundred megacycle range and having a bandwidth in the two hundred megacycle region, said first and second input amplifiers having a common input circuit receiving the signal to be selectively delayed, said first and second output amplifiers having a common output circuit, said amplifiers being normally conductive, means to simultaneously gate off said first input amplifier and said first output amplifier to provide said second signal path for said received signal, and alternate means to gate off simultaneously said second input amplifier and said second output amplifier to provide said first signal path for said received signal.

2. A wideband delay device as described in claim 1 wherein each of said first and second input transistor amplifiers include an output transformer in the form of a transmission line, said transformer providing a gain of four to one and wherein said common output circuit is comprised of a common transmission line output transformer with a ratio of four to one for gain purposes.

References Cited by the Examiner

UNITED STATES PATENTS

| | | | |
|---|---|---|---|
| 2,229,089 | 1/1941 | Kinsburg | 328—152 X |
| 2,866,092 | 12/1958 | Raynsford | 328—94 X |
| 2,872,575 | 2/1959 | Martin | 328—96 X |
| 2,913,595 | 11/1959 | Kaufmann | 328—155 X |
| 3,156,896 | 11/1964 | Martin et al. | 328—61 X |

ARTHUR GAUSS, *Primary Examiner.*

S. D. MILLER, *Assistant Examiner.*